United States Patent
Hays

(10) Patent No.: US 8,839,015 B2
(45) Date of Patent: *Sep. 16, 2014

(54) SYSTEMS AND METHODS FOR REDUCING POWER CONSUMPTION OF A COMMUNICATION DEVICE

(71) Applicant: Robert Hays, Portland, OR (US)

(72) Inventor: Robert Hays, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,262

(22) Filed: Oct. 8, 2012

(65) Prior Publication Data

US 2013/0039363 A1    Feb. 14, 2013

Related U.S. Application Data

(63) Continuation of application No. 11/936,327, filed on Nov. 7, 2007, now Pat. No. 8,312,307.

(51) Int. Cl.
 G06F 1/00 (2006.01)
 G06F 1/32 (2006.01)
 H04L 12/10 (2006.01)

(52) U.S. Cl.
 CPC .................................. *H04L 12/10* (2013.01)
 USPC .......................................... 713/323; 713/320

(58) Field of Classification Search
 CPC ................................ G06F 1/32; G06F 1/3203
 USPC ................................................. 713/323, 320
 See application file for complete search history.

(56) References Cited

U.S. PATENT DOCUMENTS

| 5,560,022 | A | 9/1996 | Dunstan et al. |
| 5,802,305 | A * | 9/1998 | McKaughan et al. ......... 709/227 |
| 6,292,831 | B1 * | 9/2001 | Cheng ........................... 709/224 |
| 6,377,512 | B1 | 4/2002 | Hamamoto et al. |
| 6,463,542 | B1 * | 10/2002 | Yu et al. ......................... 713/320 |
| 6,601,178 | B1 | 7/2003 | Gulick |
| 6,934,914 | B1 | 8/2005 | Vittal et al. |
| 7,039,430 | B2 * | 5/2006 | Kang et al. ..................... 455/458 |
| 7,212,786 | B2 * | 5/2007 | Kojima et al. ................ 455/41.2 |
| 7,313,712 | B2 * | 12/2007 | Cherukuri et al. ............. 713/324 |

(Continued)

FOREIGN PATENT DOCUMENTS

| CN | 1497454 A | 5/2004 |
| CN | 1747463 A | 3/2006 |

(Continued)

OTHER PUBLICATIONS

Thompson, Geoff, "0 Base-T Possibilities", Presented to Energy Efficient Ethernet Study Group, Jul. 2007, 10 pages.

(Continued)

*Primary Examiner* — Chun Cao

(57) ABSTRACT

Generally, this disclosure describes an energy-efficient Ethernet communications approach. In at least one embodiment described herein, an Ethernet controller may be configured to operate in an active power state to transmit or receive data packets at a maximum available link speed. The maximum available link speed may be determined by a negotiation between the Ethernet controller and a link partner coupled to the Ethernet controller. Once the data packets are transmitted or received, the Ethernet controller may be configured to operate in an idle power state to reduce energy consumption.

20 Claims, 5 Drawing Sheets

(56) References Cited

U.S. PATENT DOCUMENTS

| | | | |
|---|---|---|---|
| 7,320,080 B2 | 1/2008 | Solomon et al. | |
| 7,346,715 B2 | 3/2008 | Hatano | |
| 7,356,561 B2 | 4/2008 | Balachandran et al. | |
| 7,426,597 B1 | 9/2008 | Tsu et al. | |
| 7,564,812 B1 | 7/2009 | Elliott | |
| 7,573,940 B2 | 8/2009 | Connor et al. | |
| 7,577,857 B1* | 8/2009 | Henderson et al. | 713/320 |
| 7,813,296 B2 | 10/2010 | Lindoff et al. | |
| 7,869,360 B2 | 1/2011 | Shi | |
| 7,925,908 B2 | 4/2011 | Kim | |
| 8,145,920 B2 | 3/2012 | Tsai et al. | |
| 8,312,307 B2* | 11/2012 | Hays | 713/323 |
| 2002/0196736 A1 | 12/2002 | Jin | |
| 2003/0126494 A1 | 7/2003 | Strasser | |
| 2003/0196137 A1 | 10/2003 | Ahmad et al. | |
| 2004/0025063 A1 | 2/2004 | Riley | |
| 2004/0029622 A1 | 2/2004 | Laroia et al. | |
| 2004/0073723 A1 | 4/2004 | Hatano | |
| 2004/0106431 A1 | 6/2004 | Laroia et al. | |
| 2004/0128387 A1 | 7/2004 | Chin et al. | |
| 2005/0003836 A1 | 1/2005 | Inoue et al. | |
| 2005/0063302 A1 | 3/2005 | Samuels et al. | |
| 2005/0097378 A1 | 5/2005 | Hwang | |
| 2005/0128990 A1* | 6/2005 | Eom et al. | 370/338 |
| 2005/0147082 A1 | 7/2005 | Keddy et al. | |
| 2005/0190709 A1* | 9/2005 | Ferchland et al. | 370/311 |
| 2005/0195859 A1 | 9/2005 | Mahany | |
| 2005/0204072 A1 | 9/2005 | Nakagawa | |
| 2005/0208958 A1 | 9/2005 | Bahl et al. | |
| 2005/0243795 A1 | 11/2005 | Kim et al. | |
| 2005/0268137 A1 | 12/2005 | Pettey | |
| 2006/0164774 A1 | 7/2006 | Herbold et al. | |
| 2006/0239282 A1 | 10/2006 | Dick et al. | |
| 2006/0253735 A1 | 11/2006 | Kwak et al. | |
| 2007/0245076 A1 | 10/2007 | Chang et al. | |
| 2009/0164821 A1* | 6/2009 | Drescher | 713/323 |
| 2009/0196212 A1 | 8/2009 | Wentink | |
| 2010/0165846 A1 | 7/2010 | Yamaguchi et al. | |

FOREIGN PATENT DOCUMENTS

| | | |
|---|---|---|
| CN | 1809013 A | 7/2006 |
| CN | 1976297 A | 6/2007 |
| EP | 1783951 A2 | 5/2007 |
| JP | 2002-026795 A | 1/2002 |
| JP | 2004-118746 A | 4/2004 |
| JP | 2005-250671 A | 9/2005 |
| JP | 2005-328439 A | 11/2005 |
| JP | 2006-148749 A | 6/2006 |
| JP | 2006-277332 A | 10/2006 |
| JP | 2008-059577 A | 3/2008 |
| JP | 2008-167224 A | 7/2008 |
| WO | 03/060716 A1 | 7/2003 |
| WO | 2007/049203 A2 | 5/2007 |
| WO | 2008/035600 A1 | 3/2008 |
| WO | 2009/061880 A2 | 5/2009 |
| WO | 2009/061880 A3 | 7/2009 |
| WO | 20101030768 A2 | 3/2010 |
| WO | 20101030768 A3 | 7/2010 |

OTHER PUBLICATIONS

Woodruff, "10GEEE —Time to Switch", Mar. 2007, pp. 1-8.
Woodruff et al., Efficiency and EEE-Technical Feasibility, May 29, 2007, pp. 1-15.
Zimmerman, George, "Considerations for Technical Feasibility of EEE with 10GBASE-T", Solarfare Communications, Mar. 7, 2007, pp. 1-10.
Zimmerman et al., "Update on Technical Feasibility of EEE with 10GBASE-T", Solarfare Communication, Jul. 16, 2007, pp. 1-9.
Bennett et al., Minutes of Meeting held on Jan. 13, 2009, 7 pages.
Bennett et al., Minutes of Meeting held on Mar. 10, 2009, 5 pages.
Bennett et al., "Energy Efficient Ethernet Study Group Meeting Minutes", Jan. 22, 2008, 6 pages.
Bennett et al., "IEEE802.3az task force meeting", IEEE 802 Plenary, Orlando, FL, Mar. 18, 2008, 15 pages.
Bennett et al., Minutes of Meeting held on May 13, 2008, 8 pages.
Bennett et al., Minutes of Meeting held on Jul. 15, 2008, 6 pages.
Bennett et al., Minutes of Meeting held on Sep. 16, 2008, 5 pages.
Bennett et al., Minutes of Meeting held on Nov. 11, 2008, 5 pages.
Bennett, Mike, "IEEE 802.3az Energy Efficient Ethernet", Agenda and general information, Munich, Germany, May 2008, pp. 1-28.
Bennett, Mike, ""IEEE 802.3 Energy Efficient Ethernet Study Group"", Agenda and general information, SanFrancisco, California, Jul. 2007, pp. 1-31.
Barnette et al., "Speed Switching without Communication Interruption", Vitesse, Prepared for the IEEE 802.3 Study Group, pp. 1-15.
Barrass, Hugh, EEE Backplane Architecture, IEEE 802.3az EEE Task Force, Vancouver, British Columbia, Mar. 2009, pp. 1-10.
Kasturia, Sanjay, "Next Steps for EEE Draft", Jan. 13, 2009, pp. 1-15.
Kasturia, Sanjay, "Next Steps for EEE Draft", Mar. 10, 2009, pp. 1-13.
Kasturia, Sanjay, Generating the EEE Draft, 10 pages.
Kasturia, Sanjay, "Next steps for EEE Draft", Jul. 16, 2008, pp. 1-18.
Kasturia, Sanjay, "Next steps for EEE Draft", Nov. 11, 2008, pp. 1-14.
Klein, Phillippe, "802.1 AVB Power Management", Broadcom, IEEE Interim Meeting, Jan. 2009, pp. 1-15.
Koenen, David, "In support of EEE mode for 1000BASE-KX PHY", HP, IEEE 802.3az EEE Task Force, May 2008, pp. 1-8.
Koenen, David, "Conditions for Backplane PHY EEE Transitions", HP, IEEE 802.3az, Nov. 2007, pp. 1-10.
Koenen et al., "Towards consistent organization of LPI Functions, State Variables and State Diagrams", IEEE Energy Efficient Ethernet TF, Nov. 2008, pp. 1-9.
Koenen, David, "Backplane Ethernet Low-Power Idle Baseline Proposal", IEEE 802.3az EEE Task Force, Jul. 2008, pp. 1-14.
Law, David, "IEEE P802.3az Wait Time (Tw) From a System Design Perspective", IEEE P802.3az, IEEE Task Force, Version 3.0, Interim Meeting, Jan. 2009, pp. 1-18.
Law, David, "IEEE P802.3az Wake Time Shrinkage Ad Hoc report", IEEE P802.3az EEE Task Force, Version 5.0, Plenary week Meeting, Mar. 2009, pp. 1-13.
Law, David, "IEEE 802.3 Clause 30 Management, MIB, Registers and Function", IEEE P802.3az, Energy-efficient Ethernet Task Force, Plenary Week Meeting, Nov. 2007, pp. 1-13.
Law, David, "IEEE P802.3az Energy-Efficient Ethernet Architecture", IEEE P802.3az EEE Task Force, Version 2.0, Plenary week Meeting, Nov. 2008, pp. 1-20.
Law, David, "IEEE P802.3az Energy-efficient Ethernet and LLDP", IEEE P802.3az EEE Task Force, Version 1.1, Interim Meeting, May 2008, pp. 1-7.
Law, David, "IEEE P802.3az Asymmetric and Symmetric Modes", IEEE P802.3az EEE Task Force, Interim Meeting, Jan. 2009, Version 1.0, pp. 1-6.
Law, David, "Two TX Wait Timers in RS for 10GBASE-T Operation", IEEE P802.3az EEE Task Force, Version 1.0, Interim Meeting, Jan. 2009, pp. 1-4.
Kubo et al., "Hybrid LPI and Subset PHY Approach", IEEE 802.3az, NTT Access Network Service Systems Labs., NTT Corporation, Jul. 2008, pp. 1-10.
Louie et al., "Clause 73 Message p. 10", BROADCOM, IEEE 802.3az Task Force, Jan. 2009, pp. 1-6.
McIntosh, James A., "Getting Stuck in Update in the 1000BASE-T PHY Control State Machine", Vitesse Semiconductor Corp., IEEE 802.3az, Interim Meeting, Jan. 2009, pp. 1-8.
Nedevschi et al., "Reducing Network Energy Consumption via Sleeping and Rate-Adaptation", 14 pages.
Nicholl, Gary, "100GE and 40GE PCS Overview", IEEE 802.3az, Nov. 2008, pp. 1-27.
Nordman, Bruce, "Musings on Savings", IEEE 802.3az Task Force Interim Meeting, Jan. 22, 2008, 8 pages.
Parnaby, Gavin, "EEE Synchronization", Solarfare Communication, Jan. 14, 2009, pp. 1-5.
Parnaby, Gavin, "10GBASE-T ad hoc output", Solarflare Communication, Sep. 16, 2008, pp. 1-10.

(56) References Cited

OTHER PUBLICATIONS

Parnaby, Gavin, "10GBASE-T EEE Synchronization", Solarflare Communication, Nov. 11, 2008, pp. 1-16.
Parnaby, Gavin, "Filling the 10GBASE-T TBDs: WAKE & SLEEP", Solarflare Communication, Sep. 15, 2008, pp. 1-6.
Parnaby, Gavin, "10GBASE-T Parameter Values", 1 page.
Pillai et al., "Clause 49 State DiagramsClause Diagrams", BROADCOM, IEEE 802.3az, Jan. 2009, 7 pages.
Pillai, Velu, "Enhanced EEE proposal for 10GBASE-KR", BROADCOM, IEEE 802.3az, Mar. 2009, 8 pages.
Pillai et al., "KR, KX4 and KX LPI Parameters", BROADCOM, IEEE 802.3az, Jan. 2009, pp. 1-16.
Pillai, "Values Needed for 10GBASE-KR", Mar. 11, 2009, pp. 1-3.
Powell et al., "A "Subset PHY" Approach for Energy Efficient Ethernet", BROADCOM, IEEE 802.3az EEE, Jan. 2008, pp. 1-17.
Powell, Scott, "Twisted Pair Subset PHY", BROADCOM, IEEE 802.3az EEE, Mar. 2008, pp. 1-21.
Powell et al., "A Gigabit "Subset PHY"Approach for 10GBASE for 10GBASE—T Energy Efficient Ethernet", BROADCOM, IEEE 802.3az EEE, Nov. 2007, pp. 1-11.
Ratnasamy et al., "Reducing Network Energy Consumption Via Sleeping and Rate-Adaptation", pp. 1-29.
Sedarat, Hossein, "10GBASE-T EEE Specifications Alert", Aquantia, Sep. 2008, pp. 1-7.
Sedarat, Hossein, "10GBase-T EEE Specifications", Refresh, Quiet, Aquantia, Sep. 2008, pp. 1-14.
Sedarat, Hossein, "Refresh an Option to Ease 10gbase-T LPI Parameter Selection", Aquantia, Sep. 2008, pp. 1-9.
Taich et al., "Enhancements to the Low-Power Idle Mode", 802.3az Plenary Meeting, Mar. 12, 2008, pp. 1-14.
Taich et al., "10GBASE-T Low-Power Idle Proposal", 802.3az Plenary Meeting, May 11, 2008, pp. 1-22.
Taich et al., "Alert Signal Proposal for 10GBASE-T EEE", Energy Efficient Ethernet (802.3az), Seoul, Korea, Sep. 2007, pp. 1-7.
Taich, Dimitry,"Additional Test Modes Definition for 10GBASE-T LPI", Energy Efficient Ethernet (802.3az), Dallas, TX, Nov. 4, 2008, pp. 1-9.
Taich et al., "Alert Signal Proposal for 10GBASE-T EEE", Energy Efficient Ethernet (802.3az), Seoul, Korea, Sep. 13, 2008, pp. 1-8.
Taich, Dimitry, "Annex of the 10GBASE-T EEE Alert Signal Proposal", Energy Efficient Ethernet (802.3az), Seoul, Korea, Sep. 13, 2008, pp. 1-4.
Telang et al., "A "Subset PHY" Approach for 10GBASE-KR Energy Efficient Ethernet", IEEE 802.3az, Orlando, Florida, Mar. 2008, 16 pages.
Tellado et al., "Alert signal Comments for 10GBASE-T EEE", Energy Efficient Ethernet (802.3az), Dallas, US, Nov. 2008, pp. 1-9.
Thompson, Geoff, "Another View of Low Power IDLE / IDLE Toggle", Version 0.2, Orlando, Mar. 2008, pp. 1-14.
Thompson, Geoff, "Another Piece of EEE", An additional requirement for Energy Efficient Ethernet, Atlanta, Nov. 2007, 7 page.
Tidstrom, Rick, "IEEE P802.3az D1.0 Clause 55 State Diagrams updated", Broadcom, IEEE 802.3az Task Force, Nov. 2008, pp. 1-17.
Traber, Mario, "Low-Power Idle for 1000bT", IEEE P802.3az EEE Task-Force, Plenary Meeting, Mar. 2008, pp. 1-21.
Traber, Mario, "The European COC", IEEE P802.3az EEE Task-Force, Plenary Meeting, Mar. 2008, pp. 1-11.
Walewski, Joachim W., "EEE for Real-Time Industrial Ethernet (?)", IEEE 802 plenary meeting, Vancouver, BC, Mar. 10, 2009, pp. 1-15.
Wertheimer, Aviad, "Negotiation Proposal for LPI EEE", IEEE 802.3az Task Force, Mar. 2008, pp. 1-10.
Woodruff et al., "10GBASE-T EEE Proposal xLPI", Aquantia, pp. 1-11.
Zimmerman et al., "10GBase-T Active / Low-Power Idle Toggling", Energy Efficient Ethernet, Mar. 2008, pp. 1-15.
Zimmerman et al., "10GBase-T Active / Low Low-Power Idle Toggling with Sense Interval", Energy Efficient Ethernet, Mar. 2008, pp. 1-2.
Zimmerman et al., "Deep Sleep Idle Concept for PHYs", Energy Efficient Ethernet, Solarflare Communication, Nov. 6, 2007, pp. 1-14.
Barrass, Hugh, "EEE control protocol proposal", IEEE 802.3az EEE Task Force, Atlanta, Georgia, Nov. 2007, pp. 1-11.
Barrass, Hugh, "EEE Exchange of Management Information", IEEE 802.3az EEE Task Force, Vancouver, British Columbia, Mar. 2009, pp. 1-11.
Baumer et al., "A "Subset PHY" Approach for 10GBASE-KR Energy Efficient Ethernet", IEEE 802.3az, Portland, Oregon, Jan. 2008, pp. 1-7.
Bennett, Mike, "Energy Efficient Ethernet and 802.1", IEEE 802.3az Energy Efficient Ethernet Task Force, Feb. 15, 2008, pp. 1-9.
Bennett, Mike, "IEEE 802.3az Energy Efficient Ethernet", Open Questions for the Task Force, IEEE Plenary Meeting, Atlanta, GA, Nov. 2007, 13 pages.
Bennett, Mike, "IEEE 802.3az Energy Efficient Ethernet", Task Force Update, Presented to the P802.3ba Task Force, IEEE Plenary Meeting, Denver, CO, Jul. 16, 2008, pp. 1-19.
Booth, Brad, "Supporting Legacy Devices", AMCC, IEEE 802.3az Interim Meeting, Jan. 2008, 10 pages.
Booth, Brad, "Backplane Ethernet Low-Power Idle", AMCC, May 2008, 14 pages.
Chadha, Mandeep, "Transmit Amplitude Reduction "Green-T": The path to a "greener" 10BASE-T", IEEE 802.3az Interim Meeting, Jan. 2008, pp. 1-11.
Chadha, Mandeep, "Cat5 Twisted Pair Model for "Green" 10BASE-T", IEEE 802.3az Interim Meeting, Jan. 2008, pp. 1-22.
Chadha, Mandeep, "Re-optimization of Cat5 Twisted Pair Model for 10BASE-Te", IEEE 802.3az Interim Meeting, Sep. 2008, pp. 1-28.
Chou et al., "Proposal of Low-Power Idle 100Base-TX", IEEE 802.3az Task Force Interim Meeting, Jan. 2008, pp. 1-26.
Chou, Joseph, "Response to comments on Clause 24 of Draft 1p1", IEEE 802.3az Task Force Interim Meeting, Jan. 2009, pp. 1-8.
Chou et al., Low-Power Idle based EEE 100Base-TV, IEEE 802.3az Task Force Interim Meeting, Mar. 2008, pp. 1-18.
Chou et al., "EEE Compatible 100Base-TX", IEEE 802.3az Task Force Interim Meeting, May 2008, pp. 1-25.
Chou, Joseph, "Corner cases and Comments on EEE Clause 40", IEEE 802.3az Task Force Interim Meeting, Sep. 2008, pp. 1-18.
Chou, Joseph, "Making EEE GPHY more robust on corner cases", IEEE 802.3az Task Force Plenary Meeting, Nov. 2008, pp. 1-14.
Chou et al., "Feasibility of Asymmetrical Low-Power Idle 1000Base-T", IEEE 802.3az Task Force InterimMeeting, Jan. 2008, pp. 1-14.
Chou et al., "A pathway to Asymmetric EEE GPHY", IEEE 802.3az Task Force Plenary Meeting, Mar. 2008, pp. 1-23.
Chou et al., "EEE Compatible MI/GMII Interface", IEEE 802.3az Task Force Interim Meeting, May 2008, pp. 1-16.
Chou, Joseph, "Timing Parameters of LPI 100BASE-TX", IEEE 802.3az Task Force Plenary Meeting, Jul. 2008, pp. 1-14.
Frazier et al., "Technical Open Items for LPI", IEEE 802.3az, Orlando, FL, Mar. 2008, pp. 1-9.
Diab, Wael W., "802.3az Task Force Layer 2 Ad-Hoc Report", IEEE 802.3az Layer 2 Ad-Hoc Report on PlenaryMeeting, Mar. 10, 2009, pp. 1-13.
Diab, Wael W., "Discussion with 802.1 Regarding 802.3at/802.3az use of LLDP", IEEE 802.3 Joint Discussion with 802.1, Denver, Jul. 2008, pp. 1-15.
Carlson et al., "802.3az Jan. 9 Interim: LLDP's Use in EEE", IEEE P802.3az EEE, Jan. 2009, pp. 1-31.
Dietz, Bryan, "802.3az D1.1 Clause 22.2.1 Transmit Deferral during LPI",802.3az Interim Meeting, Jan. 6, 2009, pp. 1-6.
Diminico, Chris, "Physical Layer Considerations for Link Speed Transitions", EEE Study Group, pp. 1-8.
Dove, Dan, "Energy Efficient Ethernet Switching Perspective", IEEE 802.3az Interim Meeting, Jan. 2008, pp. 1-14.
Dove, Dan, "Energy Efficient Ethernet Switching Perspective", IEEE 802.3az Interim Meeting, May 2008, pp. 1-19.
Dove, Dan, "Energy Efficient Ethernet xxMII Clarifications", IEEE 802.3az Interim Meeting, May 2008, pp. 1-7.
Diab, Wael W., "Energy Efficient Ethernet and 802.1", IEEE 802 Plenary, Atlanta, GA, Nov. 16, 2007, 23 pages.

(56) References Cited

OTHER PUBLICATIONS

Wang et al., "IEEE P802.3az/D1.1 Clause 24 Receive State Diagram Corner Case Analysis", IEEE P802.3az TaskForce, New Orleans, Jan. 2009, pp. 1-6.
Grimwood et al., "LPI Synchronization Feasibility Questions", IEEE P802.3az Task Force, Orlando, FL, Mar. 2008, pp. 1-12.
Grimwood, Mike, "Energy Efficient Ethernet 1000 BASE-T LPI WAIT-QUIET Timer", IEEE P802.3az Task Force, Seoul, Sep. 2008, pp. 1-6.
Lin et al., "IEEE P802.3az/D1.1 Clause 40 PHY Control State Diagram Corner Case Analysis", IEEE 02.3az Task Force, New Orleans, Jan. 2009, pp. 1-9.
Grimwood et al., "Energy Efficient Ethernet 1000BASE-T LPI Timing Parameters Update", IEEE P802.3az TaskForce, Denver, CO, Jul. 2008, pp. 1-9.
Grimwood et al., "IEEE P802.3az/D1.0 Clause 40 lpi_mode Encoding", IEEE P802.3az Task Force, Dallas, Nov. 2008, pp. 1-12.
Grimwood et al., "IEEE P802.3az/D1.0 Clause 55 PHY Wake Time Updated", IEEE P802.3az Task Force, Dallas, Nov. 2008, pp. 1-6.
Hays, Robert, "Terminology Proposal for LPI EEE", IEEE 802.3az Task Force, Orlando, FL, Mar. 2008, pp. 1-8.
Wertheimer et al., "Capabilities Negotiation Proposal for Energy-Efficient Ethernet", IEEE 802.3az, Munich, May 2008, pp. 1-18.
Hays et al., "Active/Idle Toggling with OBASE-x for Energy Efficient Ethernet", IEEE 802.3az Task Force, Nov. 2007, pp. 1-22.
Hays, Robert, "EEE Capabilities Negotiation Proposal Revision 2", IEEE 802.3az Task Force, May 2008, pp. 1-13.
Minutes of meeting, 802.3az Energy Efficient Ethernet (EEE) Task Force and 802.1 Data Center Bridging (DCB) Task Group Joint meeting, Wednesday, Mar. 19, 2008, 5 pages.
Parnaby et al., "10GBase-T Active / Low-Power Idle Toggling", Energy Efficient Ethernet, Jan. 2008, pp. 1-14.
Teener, Michael D., "Joint ITU-T/IEEE Workshop on Carrier-class Ethernet", AudioNideo Bridging for Home Networks, IEEE 802.1 AV Bridging Task Group, Geneva, May 31—Jun. 1, 2007, 35 pages.
Healey et al., "1000BASE-T Low-Power Idle", IEEE P802.3az Task Force Meeting, Jan. 2008, pp. 1-14.
Healey et al., "1000BASE-T Low-Power Idle update", IEEE P802.3az Task Force Meeting, Orlando, FL, Mar. 18, 2008, pp. 1-13.
Healey et al., "1000BASE-T Low-Power Idle", IEEE P802.3az Task Force Meeting, Munich, Germany, May 13, 2008, pp. 1-22.
Fitzgerald et al., "1000BASE-T PHY Control State Diagram Modifications", IEEE P802.3az Task Force Meeting, New Orleans, LA, Jan. 2009, pp. 1-25.
Healey, Adam, "Proposed Modifications to IEEE 802.3az/D0.9 Clause 40", IEEE P802.3az Task Force Meeting, Seoul, KR, Sep. 2008, pp. 1-13.
Healey, Adam, "Observations regarding Energy Efficient 1000BASE-KX", IEEE P802.3az Task Force Meeting, Dallas, TX, Nov. 2008, pp. 1-13.
Healey, Adam, "PHY timers for 1000BASE-T Energy Efficient Ethernet", IEEE P802.3az Task Force Meeting, Vancouver, BC, Mar. 11, 2009, pp. 1-13.
Healey et al., "Supporting material related to comments against Clause 40", IEEE P802.3az Task Force Meeting, Dallas, TX, Nov. 11, 2008, pp. 1-29.
International Search Report and Written Opinion received for PCT Patent Application No. PCT/US2008/082577, mailed on May 25, 2009, 10 pages.
International Preliminary Report on Patentability for PCT Patent Application No. PCT/US2008/082577 mailed on May 20, 2010, 6 pages.
Office Action Received for Chinese Patent Application No. 200880115221.6, mailed on Jan. 7, 2013, 6 Pages of Chinese Office Action and 8 Pages of English Translation.
Office Action Received for U.S. Appl. No. 11/936,327, mailed on Aug. 26, 2011, 8 pages.
Office Action Received for U.S. Appl. No. 11/936,327, mailed on Jan. 11, 2011, 8 pages.
Office Action Received for U.S. Appl. No. 11/936,327, mailed on Jan. 24, 2012, 8 pages.
Notice of Allowance Received for U.S. Appl. No. 11/936,327, mailed on Jul. 18, 2012, 25 pages.
Office Action Received for U.S. Appl. No. 11/296,958, mailed on Dec. 2, 2008, 21 pages.
Notice of Allowance Received for U.S. Appl. No. 11/296,958, mailed on Apr. 3, 2009, 4 pages.
Office Action Received for U.S. Appl. No. 12/208,905, mailed on Apr. 12, 2011, 14 pages.
Office Action Received for U.S. Appl. No. 12/208,905, mailed on Aug. 1, 2011, 16 pages.
Notice of Allowance Received for U.S. Appl. No. 12/208,905, mailed on Nov. 18, 2011, 16 pages.
Agarwal et al., "Dynamic Power Management using on Demand Paging for Networked Embedded System", Proceedings of the 2005 Asia and South Pacific Design Automation Conference, vol. 2, Jan. 18-21, 2005, 5 pages.
Shih et al., "Physical Layer Driven Protocol and Algorithm Design for Energy-Efficient Wireless Sensor Networks", Proceedings of the 7th annual international conference on Mobile computing and networking; Rome, Italy, Jul. 15-21, 2001, 14 pages.
Office Action Received for Chinese Patent Application No. 200880115221.6, mailed on Apr. 6, 2012, 6 Pages of Chinese Office Action and 9 Pages of English Translation.
Magic PacketTechnology, AMD, Publication No. 20213, Rev: A, Amendment/O, Nov. 1995, pp. 1-6.
"Broad Market Potential", IEEE interim meeting, Geneva, CH, May 2007, pp. 1-5.
"Energy Efficient Ethernet Call-For-Interest Summary and Motion", IEEE 802.3 Working Group, Dallas, TX, Nov. 16, 2006, pp. 1-8.
Bennett, Mike, "IEEE 802.3 Energy Efficient Ethernet Study Group", Agenda and General Information, Monterey, CA, Jan. 2007, pp. 1-25.
Bennett, Mike, "IEEE 802.3 Energy Efficient Ethernet Study Group", Agenda and General Information, Orlando, FL, Mar. 2007, pp. 1-26.
Bennett, Mike, "IEEE 802.3 Energy Efficient Ethernet Study Group", Agenda and General information, Ottawa, ON, Apr. 2007, pp. 1-27.
Bennett, Mike, "IEEE 802.3 Energy Efficient Ethernet Study Group", Agenda and General Information, Geneva, Switzerland, May 2007, pp. 1-31.
IEEE Energy Efficient Ethernet Study Group, Unapproved Minutes, Ottawa, ON, Canada, Apr. 17-18, 2007, 5 pages.
Barrass, Hugh, "Energy Efficient Ethernet Objectives & 5 Criteria", A strawman to spur discussion and drive towards consensus, IEEE 802.3 Energy Efficient Ethernet, Monterey, CA, Jan. 2007, pp. 1-12.
Barrass, Hugh, "Energy Efficient Ethernet Setting the bar", A system developer's view of new PHY proposals, IEEE 802.3 Energy Efficient Ethernet, Orlando, Florida, Mar. 2007, pp. 1-7.
Barrass, Hugh, "Energy Efficient Ethernet Beyond the PHY", Power savings in networked systems, IEEE 802.3 Energy Efficient Ethernet, Geneva, Switzerland, May 2007, pp. 1-12.
Barrass, Hugh, "Energy Efficient Ethernet Transparent—not invisible", Some important considerations for management of EEE, IEEE 802.3 Energy Efficient Ethernet, San Francisco, Jul. 2007, pp. 1-8.
Bennett, Mike, "IEEE 802.3 Energy Efficient Ethernet Study Group", Server Bandwidth Utilization plots, Orlando, FL, Mar. 2007, pp. 1-13.
Booth, Brad, "802.3 Standards Development Lessons Learned", AMCC, Jan. 2007, pp. 1-19.
Chadha et al., "Feasibility of 1000-Base-T RPS Restart", Vitesse, IEEE 802.3 EEE SG, Interim Meeting, Apr. 2007, pp. 1-9.
Chadha et al., "10BT Amplitude Optimization", Vitesse, IEEE 802.3 EEE SG, Interim Meeting, Apr. 2007, pp. 1-5.
Chalupsky et al., "A Brief Tutorial on Power Management in Computer Systems", Intel Corporation, Mar. 13, 2007, pp. 1-28.
Christensen, Ken, "Rapid PHY Selection (RPS): A Performance Evaluation of Control Policies", IEEE 802.3 EEE Study Group, Monterey, CA, Jan. 15, 2007, pp. 1-45.

(56) References Cited

OTHER PUBLICATIONS

Christensen, Ken, "Rapid PHY Selection (RPS): Emulation and Experiments using PAUSE", IEEE 802.3 EEE Study Group, Orlando, FL, Mar. 13, 2007, pp. 1-16.
Carlson et al., "Energy Efficient Ethernet Another Look at the Objectives", IEEE 802.3 EEE SG, Geneva, Switzerland, May 2007, pp. 1-6.
Diab et al., "Subset PHY: Cost and Power Analysis", IEEE 802.3 EEESG, Broadcom, Seoul, South Korea, Sep. 2007, 10 pages.
"Project Authorization Request (PAR) Process", May 31, 2007, IEEE standard information technology, 3 pages.
"Energy Efficient Ethernet Call-For For-Interest", IEEE 802.3 Working Group, Dallas, TX, Nov. 14, 2006, pp. 1-22.
Bennett, Mike, "Energy Efficient Ethernet Study Group Meeting Minutes", May 29, 2007, 12 pages.
Bennett, Mike, "Energy Efficient Ethernet Study Group Meeting Minutes", Jul. 17, 2007, 7 pages.
Bennett, Mike, "Energy Efficient Ethernet Study Group Meeting Minutes", Sep. 11, 2007, 5 pages.
Frazier, Howard, "Review of the 5 Criteria", IEEE 802_3 EEESG, Jan. 2007, 29 pages.
Frazier et al., "EEE transition time constraints", IEEE 802.3 EEE SG, Geneva, CH, May 29, 2007, pp. 1-9.
Ganga et al., "End-Stations System Requirements and a proposal for EEE Objectives", IEEE 802.3 EEE SG presentation for Mar. 2007 Plenary, Mar. 9, 2007, pp. 1-12.
Grow, Bob, "802.1 and Energy Efficient Ethernet", IEEE 802.3 EEESG Interim, Seoul, Korea, Sep. 11, 2007, pp. 1-6.
Haran, Onn, "Applicability of EEE to fiber PHYs", IEEE 802.3 EEE meeting, Seoul, Korea, Sep. 2007, pp. 1-12.
Koenen, David, "EEE for Backplane PHYs in Blade Server Environment", IEEE 802.3 EEE SG, Mar. 2007, pp. 1-8.
Koenen, David, "Potential Ethernet Controller Power Savings", EEE, Geneva, May 2007, pp. 1-5.
"10GBASE-T Power Budget Summary", Tehuti Networks, Mar. 2007, pp. 1-3.
Law et al., "Scope components for Rapid PHY selection", 2 pages.
Law, David, "Transmit disable time in a packet based speed change protocol Impact on objectives", IEEE 802.3 EEE SG Interim Meeting, May 2007, pp. 1-8.
Law, David, Packet loss in protocol based speed change, IEEE 802.3 EEE SG Interim Meeting, Sep. 2007, pp. 1-12.
Holt et al., "Observations and Thoughts on Rate Switching", Mar. 13, 2007, pp. 1-8.
"IEEE Energy Efficient Ethernet Study Group", Unapproved Minutes, Orlando, FL, Mar. 13-15, 2006, 10 pages.
Nordman, Bruce, "Energy Efficient Ethernet: Outstanding Questions", IEEE 802 interim meeting, Monterey, California, Jan. 15-16, 2007, pp. 1-10.
Nordman, Bruce, "Energy Efficient Ethernet: Outstanding Questions—Update: Mar. 2007", IEEE 802 interim meeting, Orlando, Florida, Mar. 13-15, 2007, pp. 1-5.
Nordman, Bruce, "EEE Savings Estimates", IEEE 802 Plenary Meeting, San Francisco, Jul. 18, 2007, 9 pages.
Nordman, Bruce, "EEE Savings Estimates", May 25, 2007, pp. 1-11.
Nordman, Bruce, "Energy Efficient Ethernet: Outstanding Questions", Mar. 12, 2007, 3 pages.
Nordman, Bruce, "Energy Efficient Ethernet: Outstanding Questions", Mar. 19, 2007, 3 pages.
Paxson, Vern, "Some Perspectives on the Performance Impact of Link-Speed Switching Outages", Jul. 18, 2007, 10 pages.
Powell et al., "Technical Considerations and Possible Solution Sets for EEE", IEEE 802.3 Energy Efficient Ethernet Study Group Interim Meeting, Broadcom, May 2007, pp. 1-7.
Search Report Received for European Patent Application No. 088480702, mailed on Oct. 2, 2013, 3 pages of search report.
Hays, Robert, U.S. Appl. No. 11/936,327, titled "Energy Efficient Ethernet Using Active/Idle Toggling", filed Nov. 7, 2007, 31 pages.
Conner et al., U.S. Appl. No. 11/296,958, titled "Data Transmission at Efficient Data Rates", filed Dec. 7, 2005, 33 pages.
Conner et al., U.S. Appl. No. 12/484,028, titled "Energy Efficient Data Transmission", filed Jun. 12, 2009, 37 pages.
Office Action Received for U.S. Appl. No. 12/484,028, mailed on Nov. 5, 2012, 15 pages.
Office Action Received for U.S. Appl. No. 12/484,028, mailed on Sep. 19, 2013, 20 pages.
Office Action Received for U.S. Appl. No. 12/484,028, mailed on Apr. 5, 2013, 20 pages.
Wertheimer et al., U.S. Appl. No. 12/381,811, titled "Negotiating a Transmit Wake Time", filed Mar. 17, 2009, 31 pages.
Notice of Allowance Received for U.S. Appl. No. 12/381,811, mailed on Aug. 31, 2011, 9 pages.
Supplemental Notice of Allowance Received for U.S. Appl. No. 12/381,811, mailed on Feb. 9, 2012, 9 pages.
Office Action Received for U.S. Appl. No. 13/489,434, mailed on Dec. 26, 2012, 9 pages.
Notice of Allowance Received for U.S. Appl. No. 13/489,434, mailed on Jun. 4, 2013, 8 pages.
Tsai et al., U.S. Appl. No. 12/208,905, titled "Techniques for Collaborative Power Management for Heterogeneous Networks", filed Sep. 11, 2008, 48 pages.
Tsai et al., U.S. Appl. No. 13/889,472, titled "Techniques for Collaborative Power Management for Heterogeneous Networks", filed May 8, 2013, 16 pages.
Tsai et al., U.S. Appl. No. 60/973,044, titled "Techniques for Collaborative Power Management for Heterogeneous Networks", filed Sep. 17, 2007, 48 pages.
International Search Report and Written Opinion for PCT Patent Application No. PCT/US2009/056498, mailed on May 3, 2010, 5 pages.
International Preliminary Report on Patentability received for PCT Patent Application No. PCT/US2009/056498, mailed on Mar. 24, 2011, 5 pages.
Kulkarni et al., "Energy Efficient Communication Based on User Workloads", University of Texas at Dallas, (May 19, 2008), 5 pgs.
Office Action Received for U.S. Appl. No. 12/210,016, mailed on Jun. 9, 2011, 16 pages.
Notice of Allowance Received for U.S. Appl. No. 12/210,016, mailed on Mar. 5, 2012, 13 pages.
Wang et al., U.S. Appl. No. 12/210,016, titled "Generating, At Least in Part, and/or Receiving, At Least in Part, At Least One Request", filed Sep. 12, 2008, 25 pages.
Office Action Received for Japanese Patent Application No. 2011-526969, mailed on Jun. 5, 2012, 2 pages of office action and 2 pages of english translation.
Office Action Received for Japanese Patent Application No. 2011-526969, mailed on Oct. 2, 2012, 2 pages of office action and 2 pages of english translation.
Office Action Received for Chinese Patent Application No. 200980135378.X, mailed on Mar. 6, 2013, 11 pages of office action and 14 pages of english translation.
Office Action Received for Korean Patent Application No. 10-2011-7005968, mailed on Jun. 19, 2012, 3 pages of office action and 2 pages of english translation.
Wang et al., U.S. Appl. No. 13/540,246, titled "Generating, At Least in Part, and/or Receiving, At Least in Part, At Least One Request", filed Jul. 2, 2012, 24 pages.
Office Action Received for U.S. Appl. No. 13/540,246, mailed on Oct. 1, 2013, 23 pages.
Office Action Received for European Patent Application No. 08848070.2, mailed on Oct. 2, 2013, 9 pages.
Office Action Received for Chinese Patent Application No. 200980135378.X, mailed on Aug. 26, 2013, 3 pages of office action and 4 pages of english translation.
Office Action Received for Japanese Patent Application No. 2012-286613, mailed on Jan. 14, 2014, 1 page of office action and 1 page of english translation.
Wertheimer et al., U.S. Appl. No. 13/489,434, titled "Negotiating a Transmit Wake Time", filed Jun. 5, 2012, 35 pages.

* cited by examiner

SYSTEMS AND METHODS FOR REDUCING POWER CONSUMPTION OF A COMMUNICATION DEVICE

RELATED APPLICATIONS

This application is a Continuation of pending U.S. patent application Ser. No. 11/936,327, entitled "SYSTEMS AND METHODS FOR REDUCING POWER CONSUMPTION DURING COMMUNICATION BETWEEN LINK PARTNERS" filed on Nov. 7, 2007; this application is entirely incorporated by reference.

FIELD

The present disclosure relates to Ethernet communications, and, more particularly, to energy efficient Ethernet using active/idle toggling.

BACKGROUND

Current Ethernet solutions either remain operating at a given speed, e.g. 1000BASE-T, regardless of the bandwidth utilization, and thus consume more power than necessary, or they require software drivers to drop the link and auto-negotiate to a new, lower speed to save power, but losing link for several seconds in the process making that option unsuitable for many applications. IEEE 802.3 Working Group has recently formed an Energy-Efficient Ethernet (EEE) Task Force, officially named 802.3az, to define a solution for reducing the average power consumption of Ethernet by addressing the issues noted above with current solutions. So far there have been two proposals to the IEEE Task Force for EEE, both of which recommend rate-shifting to track the bandwidth utilization demand. Rate-shifting, as proposed by the EEE Task Force, is a technique where the Ethernet communication speed may be up-shifted or down-shifted, depending on bandwidth demand. For example, during periods of low demand, the speed may be shifted down from a fast communication speed to a slower communication speed (e.g., 1000BASE-T to 100BASE-TX). As demand increases, the speed may be shifted up.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Generally, this disclosure describes an energy-efficient Ethernet communications approach. In at least one embodiment described herein, an Ethernet controller may be configured to operate in an active power state to transmit or receive data packets (when available) at a maximum available link speed. The maximum available link speed (e.g., 1000BASE-T (GbE), 10GBASE-T, etc.) may be determined by a negotiation between the Ethernet controller and a link partner coupled to the Ethernet controller. Once the data packets are transmitted or received, the Ethernet controller may be configured to operate in an idle power state to reduce energy consumption. The "idle power state", as used herein, may be defined as a power state that is sufficient to maintain an open link with the link partner, but insufficient to transmit or receive data. In other words, the "idle power state", as used herein, is a threshold power consumption state that is below a power consumption state to transmit at least one data packet, while maintaining the Ethernet communications link between the Ethernet controller and the link partner. The "active power state", as used herein, may include an "active data transmission power state" defined as a power state to transmit data at a maximum available link speed, and an "active data receive power state" defined as a power state to receive data at a maximum available link speed.

Figure 1:
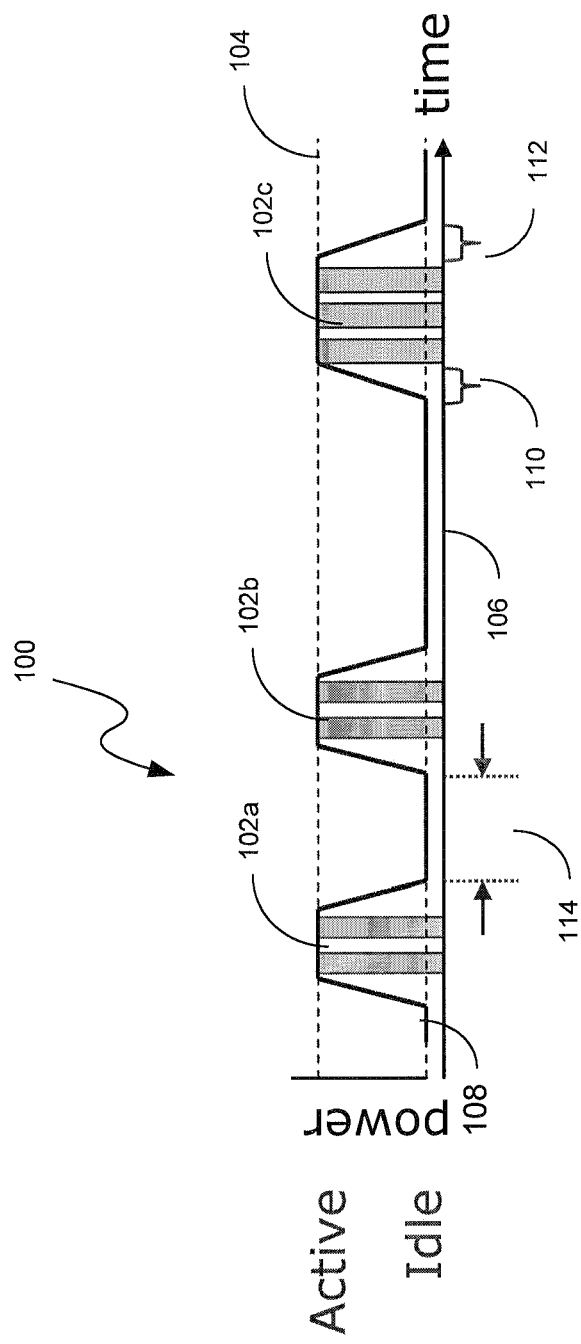
FIG. 1 depicts a graph of power vs. time consistent with one exemplary embodiment of the present disclosure.

FIG. 1 depicts a graph 100 of power vs. time consistent with one exemplary embodiment of the present disclosure. In this embodiment, data packets 102a, 102b, 102c may be transmitted or received in a burst fashion at a maximum active power state 104 (e.g., a maximum available link speed). When data packets are available to be transmitted or received, an Ethernet controller (not shown in this Figure) may toggle power between an idle state 108 and an active state 104. In this example, the active power state 104 is a power state associated with the maximum available data transmission or reception speed. The idle power state 108 is a power state that is sufficient to maintain an open link with the link partner, but insufficient to transmit or receive data. The idle power state 108, in this example, represents a power consumption that is slightly larger than an off state 106 and significantly lower than the active power state 104.

During a transition from idle power state 108 to active power state 104, there may be a first delay period 110. Likewise, during a transition between the active power state 104 to the idle power state 108, there may be a second delay period 112. The idle interval 114 between packet bursts (e.g., between burst 102a and 102b) may be based on bandwidth considerations and/or the amount of data available in a data buffer.

Figure 2:
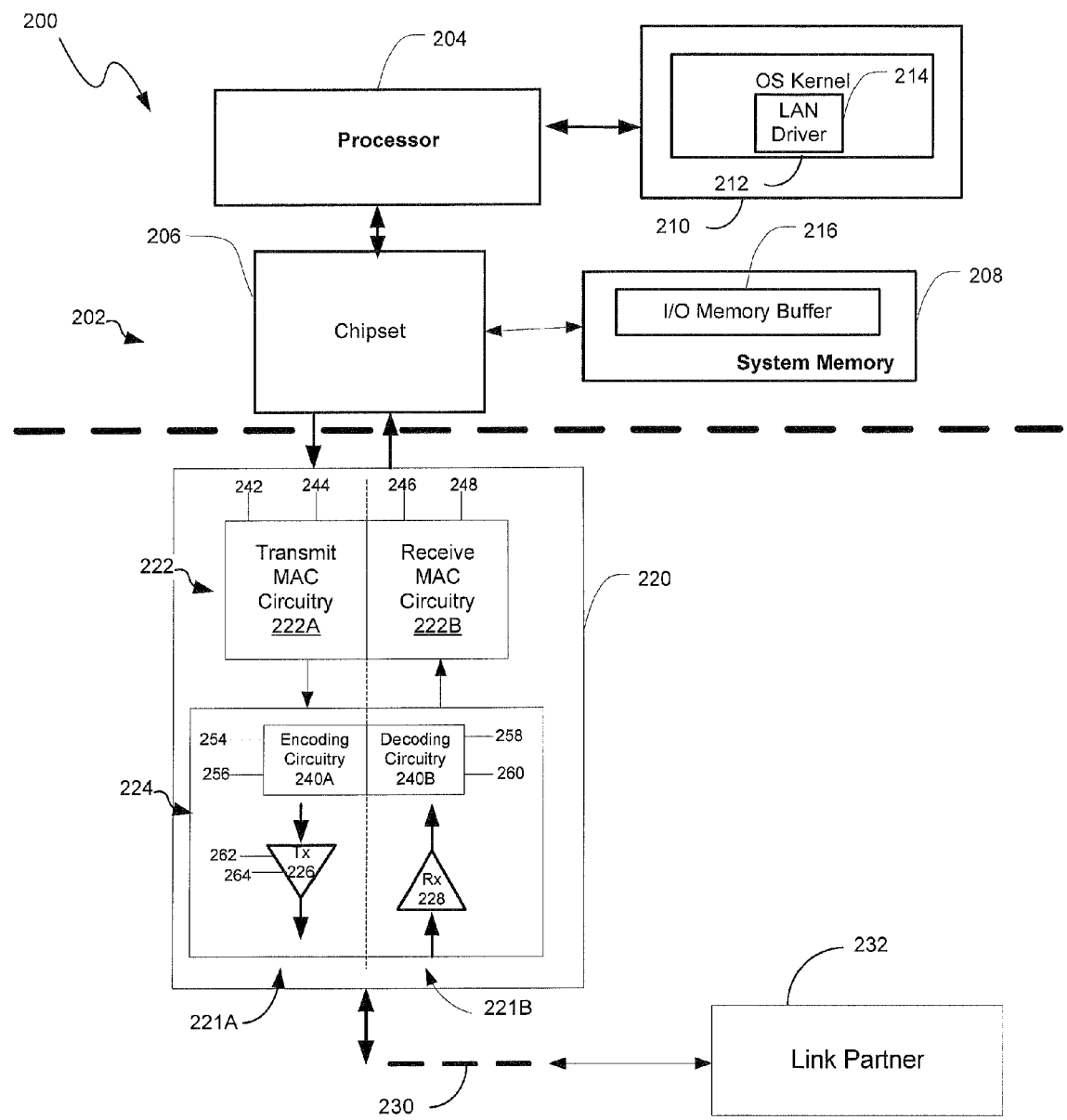
FIG. 2 illustrates a system embodiment consistent with the present disclosure.

FIG. 2 illustrates a system embodiment 200 consistent with the present disclosure. The system 200 includes a host system 202 and an Ethernet controller 220. The host system 202 may include a host processor 204, chipset circuitry 206 and system memory 208. The host processor 204 may include one or more processor cores and may be configured to execute system software 210. System software 210 may include, for example, operating system code 212 (e.g., OS kernel code) and local area network (LAN) driver code 214. LAN driver code 214 may be configured to control, at least in part, the operation of the Ethernet controller 220 operation, as will be described in greater detail below. System memory 208 may include I/O memory buffers 216 configured to store one or more data packets that are to be transmitted by, or received by, Ethernet controller 220. Chipset circuitry 206 may generally include "North Bridge" circuitry (not shown) to control communication between the processor 204, Ethernet controller 220 and system memory 208. Also, chipset circuitry 206 may include "South Bridge" circuitry (not shown) to control I/O communications between the host system 202 and the Ethernet controller 220. "South Bridge" circuitry may include I/O bus circuitry which may comply, or is compatible, with PCI-Express communications protocol to provide communications between chipset circuitry 206 and the Ethernet controller 220.

Ethernet controller 220 may be logically and/or physically divided into a transmit path 221A and a receive path 221B. The Ethernet controller may generally include Ethernet media access control (MAC) circuitry 222 and physical interface (PHY) circuitry 224. MAC circuitry 222 may include transmit MAC circuitry 222A configured to assemble data to be transmitted into frames, or packets, that include destination and source addresses along with network control information and error detection hash values. MAC circuitry 222 may also include receive MAC circuitry 222B configured to remove data from received frames and place the data in system memory 208. PHY circuitry 224 may include encoding circuitry 240A configured to encode data packets and decoding circuitry 240B configured to decode data packets. Encoding circuitry 240A and decoding circuitry 240B may collectively be embodied as a processor (for example, a digital signal processor) configured to perform analog-to-digital and digital-to-analog conversion, encoding and decoding of data, analog parasitic cancellation (for example, cross talk cancellation), and recovery of received data. PHY circuitry 224 may also include transmit (Tx) circuitry 226 configured to transmit one or more data packets and receive (Rx) circuitry 228 configured to receive one or more data packets. Rx circuitry 228 may include phase lock loop circuitry (PLL, not shown) configured to coordinate timing of data reception. The PHY circuitry 224 may be coupled to an Ethernet communications link 230. The Ethernet communications link 230 may comprise, for example, a media dependent interface which may include, for example Category 6 (Cat6) Ethernet cable.

Transmit MAC circuitry 222A may include a controllable clock input 242 and a controllable power input 244. Clock input 242 may generally include a clock signal that controls the clocking of the MAC circuitry 222A. Power input 244 may generally include a power supply signal to supply power to one or more components of the MAC circuitry 222A. Similarly, Receive MAC circuitry 222B may include a controllable clock input 246 and a controllable power input 248. Clock input 246 may generally include a clock signal that controls the clocking of the MAC circuitry 222B. Power input 248 may generally include a power supply signal to supply power to one or more components of the MAC circuitry 222B. Encoding circuitry 240A may include a controllable clock input 254 and a controllable power input 256, and decoding circuitry 240B may include a controllable clock input 258 and a controllable power input 260. Transmit circuitry 226 may include a controllable clock input 262 and a controllable power input 264. In one embodiment, clocking of the transmit path 221A and receive path 221B may be independently controlled. Also, in one embodiment, the power of transmit path 221A and receive path 221B may be independently controlled.

The Ethernet controller 220 may be configured to exchange commands and data with a link partner 232, via communications link 230. "Link partner" as used herein, means any device that is configured to communicate with the Ethernet controller 220 using an Ethernet communications protocol. In at least one embodiment, the link partner 232 may include a switch, bridge, router and/or other Ethernet controller (which may be associated with a host system similar to host system 202) that may be configured and operate in a manner consistent with the description of the Ethernet controller 220 provided herein.

Ethernet controller 220 may be configured to transmit at least one data packet to the link partner 232, or receive at least one data packet from the link partner 232. As stated, the Ethernet controller 220 may be configured to operate, at least in part, in an idle power state and an active power state. In one embodiment, to transition into the idle state from the active data transmission power state, the Ethernet controller 220 may be configured to control the clock input 242, 254 and/or 262. To transition into the idle power state from an active data reception power state, the Ethernet controller 220 may be configured to control the clock input 246 and/or 258. To that end, the clock inputs 242, 254, 262, 246 and/or 258 may be gated (clock gating) to turn the clock signal OFF to the corresponding circuitry.

To permit asymmetric power management, the clock inputs of the transmit path circuitry may be controlled independently of the clock inputs of the receive path circuitry. This may allow, for example, the circuitry in that transmit path 221A to be in the idle power state while the circuitry in the receive path 221B is in the active state (or, vice-versa). Clock gating, as used herein, may provide a mechanism to achieve idle power state, as defined herein, in which the power consumption of the circuitry that is clock gated is sufficient to maintain an open link with the link partner 232 (via communications link 230), but insufficient for the Ethernet controller 220 to transmit or receive data. To transition from the idle power state to the active power state, the Ethernet controller 220 may be configured to turn the clock signals 242, 254, 262, 246 and/or 258 to an ON state to permit, for example, the Ethernet controller 220 to transmit and/or receive data.

Operations of the Ethernet controller 220 during data transmission and data reception, in conjunction with other features of the system of FIG. 2, are described below:

Tx Active Transition

As stated, the Ethernet controller 220 may be configured to transition, at least in part, from an idle power state to an active data transmission power state to transmit data. To that end, the LAN driver code 214, as may be executed by host processor 204, may be configured to determine the presence of at least one data packet, as may be stored in the I/O memory buffer 216, to be transmitted. The driver 214 may generate a transmit active control signal to control the Ethernet controller 220 to transition from the idle power state into an active data transmission power state. The clock signals 242 may be applied to the transmit MAC circuitry 222A, and clock signals 254 and 262 may be applied to the encoding circuitry 240A and transmit circuitry 226, respectively. If the link partner 232 is configured in a similar manner, transmit circuitry 226 may be configured to generate a receive active control signal to "wake up" the corresponding receive circuitry and MAC circuitry of the link partner 232 in order to prepare the link partner 232 to receive data from the Ethernet controller 220. After a specified delay period (e.g., delay period 110 depicted in FIG. 1), the Ethernet controller 220 may begin to transmit data to the link partner 232.

Tx Idle Transition

As stated, the Ethernet controller 220 may be configured to transition from an active data transmission power state to an idle power state. To that end, the LAN driver code 214, as may be executed by host processor 204, may be configured to determine that there are no data packets ready for transmission, for example, by monitoring the I/O memory buffer 216, to determine if the buffer is empty. The driver 214 may generate an idle control signal to control the Ethernet controller 220 to transition from the active data transmission power state into the idle power state. The clock signal 242 may be gated to the MAC circuitry 222A to permit the MAC circuitry 222A to drop to an idle power consumption mode Likewise, clock signals 254 and/or 262 may be gated to the encoding circuitry 240A and/or transmit circuitry 226, respectively, to permit the encoding circuitry 240A and/or the transmit circuitry 226 to drop to an idle power consumption mode. If the link partner 232 is configured in a similar manner, transmit circuitry 226 may be configured to generate a receive idle control signal to transition the corresponding decoding circuitry and MAC circuitry of the link partner 232 into an idle power state.

Rx Active Transition

The Ethernet controller 220 may also be configured to transition, at least in part, from an idle power state to an active data reception power state to receive data from the link partner 232. To that end, the link partner 232 may generate a receive active control signal to the receive circuitry 228. To that end, while the decoding circuitry 240B and the receive MAC circuitry 222B may each be in an power idle state, the receive circuitry 228 may be in an active power state so that link 230 between the PHY circuitry 224 and the link partner 232 remains open. The receive active control signal generated by the link partner 232 may comprise a burst signal that can be received and recognized by the receive circuitry 228. In response thereto, the PHY circuitry 224 may transition the decoding circuitry 2240B from an idle power state to an active power state, and PHY circuitry 224 may also generate a receive active control signal to transition the receive MAC circuitry 222B from an idle power state to the active power state. To that end, the clock signals 258 and 246 may be applied (e.g., ungated) to the encoding circuitry 240B and MAC circuitry 222B, respectively, to permit the MAC circuitry 222B and decoding circuitry 240B to receive data from the link partner 232. After a defined delay period (e.g., delay period 110 depicted in FIG. 1), the Ethernet controller 220 may begin to receive data from the link partner 232. The data may be stored in the buffer memory 216.

Rx Idle Transition

As stated, the Ethernet controller 220 may be configured to transition, at least in part, from an active data reception power state to an idle power state. To that end, PHY circuitry 224 may be configured to receive a receive idle control signal from the link partner 232. In response thereto, the PHY circuitry 224 may transition the decoding circuitry 240B from an active power state to the idle power state (which, as noted above, may include clock gating of the decoding circuitry 240B). PHY circuitry 224 may also generate a receive idle control signal to transition the receive MAC circuitry 222B from an active data reception power state to the idle power state.

The control signals exchanged between the Ethernet controller 220 and the link partner 232, as described above, may include, for example, control frames generated by respective PHY circuitry that include encoded signals to transition to the active power state or the idle power state. Alternatively, the control signals may comprise analog burst signals having predefined characteristics that may be interpreted by respective PHY circuitry as control signals to transition into the active power state or the idle power state. Further alternatively, such control signals may be generated by MAC circuitry 222 in the form of, for example, header or footer data within a data packet.

Figure 3:
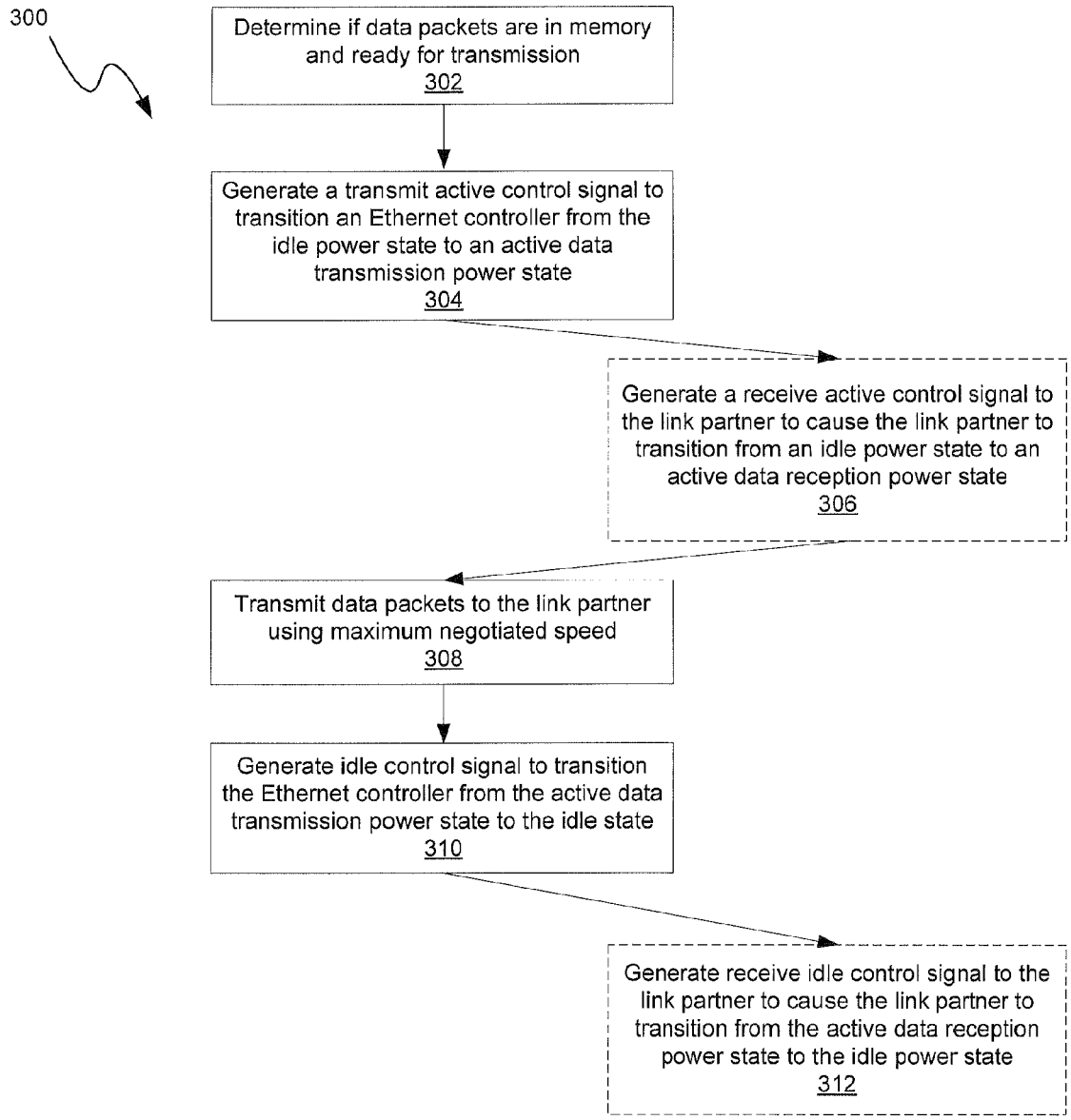
FIG. 3 depicts a flowchart of exemplary data transmission operations consistent with the present disclosure.

FIG. 3 depicts a flowchart 300 of exemplary data transmission operations consistent with the present disclosure. Operations may include determining if data packets are in memory and available for transmissions 302. Operations may also include generating a transmit active control signal to transition an Ethernet controller, at least in part, from an idle power state to an active data transmission power state 304. If a link partner, coupled to the Ethernet controller is similarly configured, operations may also include generating a receive active control signal to the link partner to cause the link partner to transition, at least in part, from an idle power state to an active data reception power state 306. Operations may also include transmitting data packets to the link partner using a maximum negotiated speed 308. Once the data packets are transmitted, operations may further include generating an idle control signal to transition the Ethernet controller from the active data transmission power state to the idle power 310. Again, if the link partner is similarly configured, operations may also include generating a receive idle control signal to the link partner to cause the link partner to transition from the active data reception power state to the idle power state 312.

Figure 4:
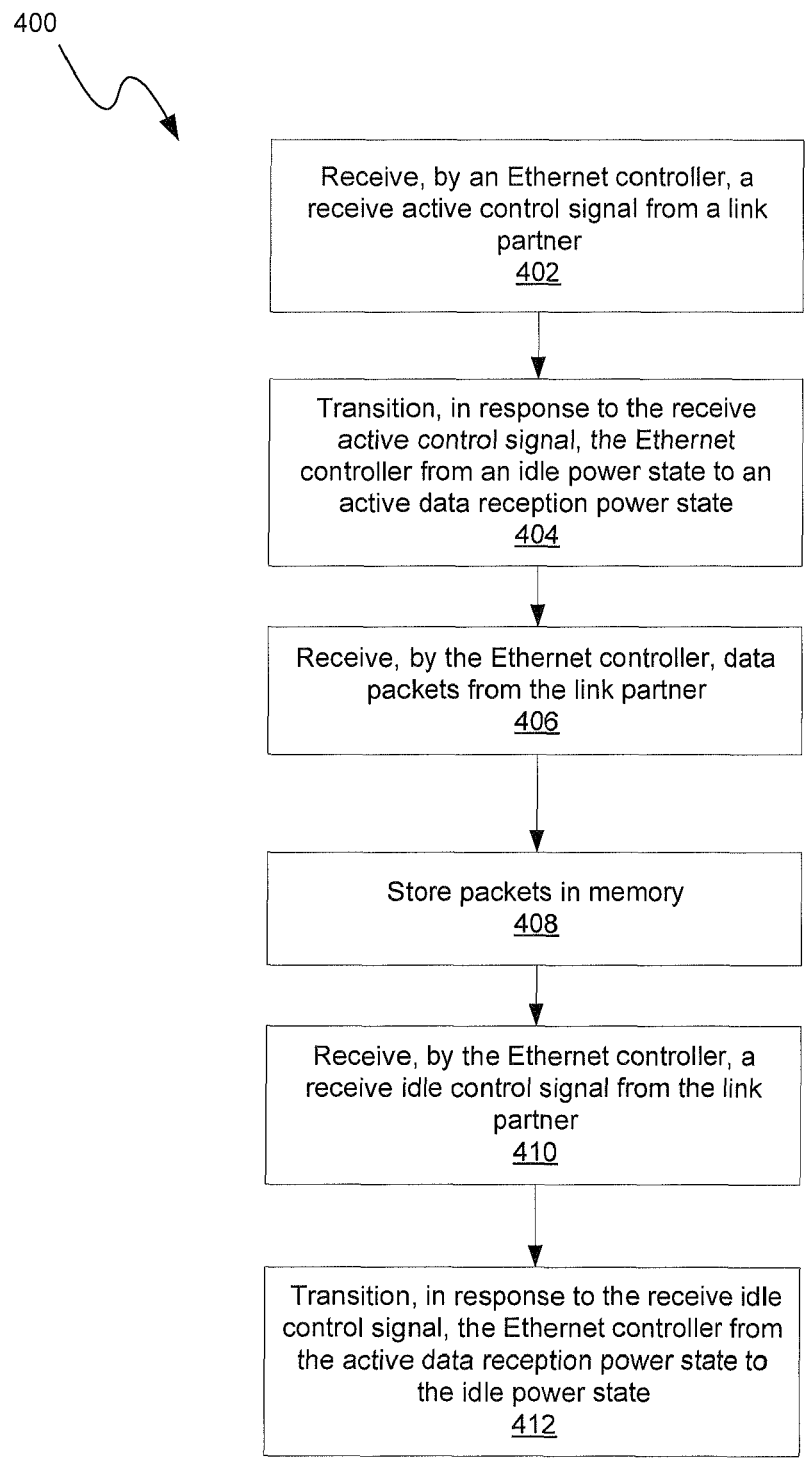
FIG. 4 depicts a flowchart of exemplary data reception operations consistent with the present disclosure.

FIG. 4 depicts a flowchart 400 of exemplary data reception operations consistent with the present disclosure. Operations may include receiving, by an Ethernet controller, a receive active control signal from a link partner 402. Operations may also include transitioning, at least in part and in response to the receive active control signal, the Ethernet controller from an idle power state to an active data reception power state 404. Operations may also include receiving, by the Ethernet controller, data packets from the link partner 406. The data packets may be stored in memory 408. Operations may also include receiving, by the Ethernet controller, a receive idle control signal from the link partner 410. Operations may also include transitioning, at least in part and in response to the receive idle control signal, the Ethernet controller from the active data reception power state to the idle power state 412.

Figure 5A:
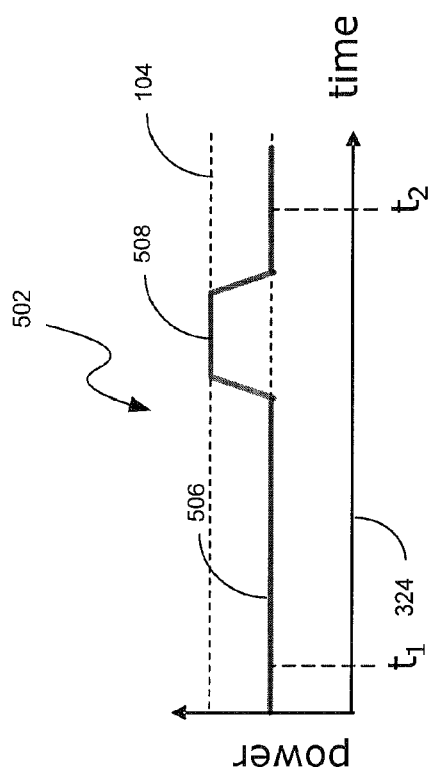
FIG. 5A depicts a power profile graph according to a rate-shifting Ethernet communications technique.
Figure 5B:
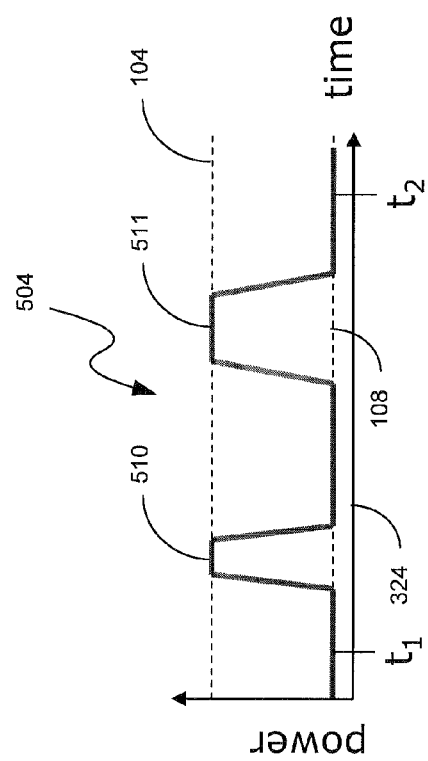
FIG. 5B depicts a power profile graph consistent with the present disclosure.

The foregoing description of idle power state in connection with an Ethernet controller offer significant power savings over other approaches. FIG. 5A depicts a power profile graph 502 according to a rate-shifting Ethernet communications technique, and FIG. 5B depicts a power profile graph 504 consistent with the present disclosure. In general, power consumption (energy consumption) may be expressed as the area under the power curve, i.e., $$\int_{t1}^{t2} \text{power}(t) dt$$

Average power may be defined as energy consumption over a given time interval. As shown, the power profile 502 of the rate-shifting technique starts at a first power level 506 where data transmission or reception is possible but at a relatively low bandwidth, for example $\frac{1}{10}^{th}$ or $\frac{1}{100}^{th}$ the maximum rate, and, based on increased bandwidth utilization or other considerations, increases power to a second higher level 508 for faster data transmission or reception. Thus, the energy consumption is defined as both the area under region 506 and under region 508. In contrast, the power profile 504 according to the present disclosure, data is transmitted or received at a maximum available speed, as depicted as the area in regions 510 and 511. Once data is transmitted or received, the power is reduced to the idle power state 108. The average power utilized by the rate shifting technique is greater than the average power utilized by the active/idle toggle technique of the present disclosure, especially when long-term usage is considered. Unexpectedly, the applicant herein has determined that while the operating power is greater at the fastest available speed, total energy consumption is reduced, by completing the transmission more quickly and transitioning to the idle power state after data transmission or reception.

The foregoing examples are described in reference to power gating of one or more components of the Ethernet controller to achieve an idle power state. In other embodiments, additionally or as an alternative to clock gating, the Ethernet controller may also be configured to discontinue power (e.g., power gating) to the MAC circuitry 222 and/or the PHY circuitry 224. While power gating may achieve the appropriate idle power state as defined herein, this technique may cause an additional delay between idle to active transition.

Ethernet controller 220 may also include I/O bus circuitry (not shown) to provide I/O communications between the Ethernet controller 220 and the chipset circuitry 206 (such bus circuitry may comply with the aforementioned PCI-Express communications protocol). Ethernet controller may also include MAC/PHY interface circuitry (not shown) configured to provide I/O communications between the MAC circuitry 220 and the PHY circuitry 224 (which may include, for example SGMII or XAUI).

Memory 208 and/or memory associated with the Ethernet controller 220 (not shown) may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 208 and/or memory associated with the Ethernet controller 220 (not shown) may comprise other and/or later-developed types of computer-readable memory. Embodiments of the methods described herein may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

The Ethernet communications protocol, described herein, may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard.

As used herein, a "PHY" may be defined as an object and/or circuitry used to interface to one or more devices, and such object and/or circuitry may be defined by one or more of the communication protocols set forth herein. The PHY may comprise a physical PHY comprising transceiver circuitry to interface to the applicable communication link. The PHY may alternately and/or additionally comprise a virtual PHY to interface to another virtual PHY or to a physical PHY. PHY circuitry 224 may comply or be compatible with the aforementioned IEEE 802.3 Ethernet communications protocol, which may include, for example, 100BASE-TX, 100BASE-T, 10GBASE-T, 10GBASE-KR, 10GBASE-KX 4/XAUI, 40GbE and or 100GbE compliant PHY circuitry, and/or PHY circuitry that is compliant with an after-developed communications protocol.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system comprising:
    circuitry capable, when operational, to:
        cause generation of a signal for a first link partner signaling a first low power state;
        cause generation of a signal for the first link partner signaling end of the first low power state;
        await a first predefined period of time;
        after the first predefined period of time, cause transmission of at least one Ethernet data frame to the first link partner;
        receive indication of a signal from the first link partner signaling a second low power state;
        receive indication of a signal from the first link partner indicating end of the second low power state; and
        receive at least one Ethernet data frame from the first link partner.

2. The system of claim 1,
    wherein the circuitry comprises circuitry capable, when operational, to:
    reduce power consumed by transmit circuitry during the first low power state; and
    reduce power consumed by receive circuitry during the second low power state.

3. The system of claim 1, wherein the circuitry comprises:
    at least one media access controller (MAC); and
    at least one interface to a PHY.

4. The system of claim 1, wherein the circuitry comprises at least one of the following: a 10GBASE-T PHY and a 1000BASE-T PHY.

5. The system of claim 1, wherein the circuitry comprises circuitry capable, when operational, to cause transfer of data frames at a data rate negotiated with the first link partner.

6. The system of claim 1, wherein the circuitry is capable to, when operational, reduce power consumed by at least one PHY during the first low power state.

7. The system of claim 1, wherein the circuitry does not transmit a data frame during the first low power state.

8. The system of claim 1, wherein the circuitry is capable to, when operational, receive a signal from a driver causing the system to enter the first low power state.

9. The system of claim 1, further comprising:
    at least one host processor; and
    at least one memory.

10. The system of claim 1, further comprising at least one of an SGMII interface and a XAUI interface.

11. A method, comprising:
    causing generation of a signal for a first link partner signaling a first low power state;

causing generation of a signal for the first link partner signaling end of the first low power state;
awaiting a first predefined period of time;
after the first predefined period of time, causing transmission of at least one Ethernet data frame to the first link partner;
receiving indication of a signal from the first link partner signaling a second low power state;
receiving indication of a signal from the first link partner indicating end of the second low power state; and
receiving at least one Ethernet data frame from the first link partner.

12. The method of claim 11, further comprising transferring Ethernet data frames at a data rate negotiated with the first link partner.

13. The method of claim 11, further comprising reducing power consumed by at least one at least one PHY during the first low power state.

14. The method of claim 11, further comprising not transmitting an Ethernet data frame during the first low power.

15. The method of claim 11, further comprising causing entering of the first low power state in response to a driver signal.

16. The method of claim 11, further comprising causing entering of the first low power state based on an amount of data available in a data buffer.

17. An article comprising a non-transitory storage medium having stored thereon instructions that when executed enable circuitry to be capable to:

cause generation of a signal for a first link partner signaling a first low power state;
cause generation of a signal for the first link partner signaling end of the first low power state;
await a first predefined period of time;
after the first predefined period of time, cause transmission of at least one Ethernet data frame to the first link partner;
receive indication of a signal from the first link partner signaling a second low power state;
receive indication of a signal from the first link partner indicating end of the second low power state; and
receive at least one Ethernet data frame from the first link partner.

18. The article of claim 17, wherein the storage medium has stored thereon instructions that when executed enable the circuitry to be capable to reduce power consumed by at least one at least one PHY during the first low power state.

19. The article of claim 17, wherein the storage medium has stored thereon instructions that when executed enable the circuitry to not cause transmission of an Ethernet data frame during the first low power state.

20. The article of claim 17, wherein the storage medium has stored thereon instructions that when executed enable the circuitry to determine when to initiate the first low power state based on an amount of data available in a data buffer.

* * * * *